US012779610B2

(12) United States Patent
Brandl et al.

(10) Patent No.: US 12,779,610 B2
(45) Date of Patent: Nov. 3, 2026

(54) METHOD FOR OPTIMIZING FORMING PROCESSES FOR FORMING WORKPIECES, AND FORMING DEVICE

(71) Applicant: Bayerische Motoren Werke Aktiengesellschaft, Munich (DE)

(72) Inventors: Reinhard Brandl, Elsendorf (DE); Julian Chander, Munich (DE); Martin Eiglsperger, Tunzenberg (DE); Ingo Heinle, Inzell (DE); Andreas Schelske, Leiblfing (DE); Christian Schelske, Marklkofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 295 days.

(21) Appl. No.: 18/706,405

(22) PCT Filed: Dec. 20, 2022

(86) PCT No.: PCT/EP2022/086875
§ 371 (c)(1),
(2) Date: May 1, 2024

(87) PCT Pub. No.: WO2023/134975
PCT Pub. Date: Jul. 20, 2023

(65) Prior Publication Data

US 2024/0416472 A1 Dec. 19, 2024

(30) Foreign Application Priority Data

Jan. 12, 2022 (DE) ..................... 10 2022 100 629.8

(51) Int. Cl.
*B23Q 15/20* (2006.01)

(52) U.S. Cl.
CPC ................................... *B23Q 15/20* (2013.01)

(58) Field of Classification Search
CPC .. B23Q 15/20; B21D 22/20; G05B 19/41875; G05B 2219/45143; G05B 2219/45152; G05B 19/401
(Continued)

(56) References Cited

U.S. PATENT DOCUMENTS

2004/0237497 A1* 12/2004 Anderson ................. B21L 9/04 59/8
2015/0153729 A1* 6/2015 Kurahashi ........ G05B 19/41875 700/110
(Continued)

FOREIGN PATENT DOCUMENTS

DE 41 03 166 C2 10/1992
DE 10 2014 201 273 A1 7/2015
(Continued)

OTHER PUBLICATIONS

International Search Report (PCT/ISA/210) issued in PCT Application No. PCT/EP2022/086875 dated Apr. 11, 2023 with English translation (6 pages).
(Continued)

*Primary Examiner* — Jigneshkumar C Patel
(74) *Attorney, Agent, or Firm* — Crowell & Moring LLP

(57) ABSTRACT

A method for optimizing forming processes for forming workpieces, in which information characterizing a relative position of a workpiece inserted in a forming device in relation to at least one reference point of the forming device is detected by means of an optical detection device, wherein at least one parameter for adjusting the respective forming process for forming the respective workpiece is determined during a respective forming process, depending on the information detected during the respective forming process and depending on the information detected during the previous forming processes performed prior to the respective
(Continued)

forming process and stored in an electronic computing device.

19 Claims, 2 Drawing Sheets

(58) Field of Classification Search
USPC .......................................................... 700/159
See application file for complete search history.

(56) References Cited

U.S. PATENT DOCUMENTS

| | | | | |
|---|---|---|---|---|
| 2016/0175911 | A1 | 6/2016 | Kraft | |
| 2021/0362277 | A1* | 11/2021 | Riechel | B23K 26/705 |
| 2023/0297063 | A1* | 9/2023 | Joseph | G05B 13/0265<br>700/159 |

FOREIGN PATENT DOCUMENTS

| | | | | | |
|---|---|---|---|---|---|
| DE | 10 2014 214 201 | A1 | | 1/2016 | |
| DE | 10 2014 019 328 | A1 | | 6/2016 | |
| DE | 102015012795 | A1 | * | 4/2017 | G01B 11/24 |
| DE | 10 2016 205 704 | A1 | | 10/2017 | |
| DE | 102016108163 | A1 | * | 11/2017 | B21C 51/00 |
| DE | 10 2018 125 035 | A1 | | 4/2020 | |

OTHER PUBLICATIONS

German-language Written Opinion (PCT/ISA/237) issued in PCT Application No. PCT/EP2022/086875 dated Apr. 11, 2023 with English translation (9 pages).

German-language Search Report issued in German Application No. 10 2022 100 629.8 dated Sep. 19, 2022 with partial English translation (13 pages).

* cited by examiner

METHOD FOR OPTIMIZING FORMING PROCESSES FOR FORMING WORKPIECES, AND FORMING DEVICE

BACKGROUND AND SUMMARY

This disclosure relates to a method for optimizing forming processes for forming workpieces. Furthermore, the disclosure relates to a forming device for forming workpieces.

DE 10 2018 125 035 A1 discloses a device for forming a workpiece, which is metallic in particular, having a forming device and a positioning device having at least one positioning element movable in its position and/or alignment relative to the forming device, wherein the positioning element is movable in its position and/or alignment relative to the forming device via an actuator.

It is the object of the disclosure to provide a method for optimizing forming processes for forming workpieces and a forming device for forming workpieces, so that a quality of the respective formed workpiece can be increased in particular.

A first aspect of the disclosure relates to a method for optimizing forming processes for forming workpieces, which are metallic in particular. The workpiece is preferably designed as a plate or a blank.

In the respective forming process, the respective workpiece is formed via a forming device, in particular via a forming tool. For example, the forming is deep drawing. The respective workpiece is preferably a respective semifinished product. This means that in the respective forming process, the respective workpiece is formed or deep drawn via the forming device, in particular via the forming tool, to form a component. The respective forming process can thus be a respective production step for producing the component. The component can be produced here from the respective workpiece. The respective workpiece can thus be understood in particular as a raw material for producing the component.

The component is preferably a shell component of a shell of a motor vehicle. The component can be designed as a body part of a body of the motor vehicle. The body of the motor vehicle is preferably designed as a self-supporting body of the motor vehicle. The motor vehicle is preferably designed as an automobile, in particular a passenger vehicle, utility vehicle, or truck.

In the respective forming process, the respective workpiece is preferably inserted in the forming device, wherein the respective workpiece inserted in the forming device is then formed via the forming tool, in particular deep drawn. The respective workpiece inserted in the forming device is preferably held by a holding element designed in particular as a plate holder. For example, the respective workpiece rests on the holding element.

The forming tool can have a stamp, by which the respective workpiece inserted in the forming device and held via the holding element can be formed.

It can be provided that during the forming, a movement of the workpiece, which is in particular held via the holding element or located in the area of the holding element, relative to the forming device takes place, wherein the workpiece is subjected here to a surface pressure resulting from a displacement of the holding element by a die. Decisive influence on the quality of the produced component can be taken by changing or influencing the surface pressure.

In deep drawing, the forming tool is designed as a deep drawing tool. The deep drawing tool comprises the stamp, the holding element, which is designed in particular as a hold down, and the die. The stamp preferably does not move during the deep drawing. This means that the stamp is stationary during a deep drawing process, in which the respective workpiece is formed via the deep drawing tool.

In a first step of the deep drawing process, the die preferably moves relative to the workpiece, in particular downward. As soon as the die, the workpiece, and the hold down are in contact, i.e., they are touching, the hold down preferably follows the movement of the die until the deep drawing tool is closed. The workpiece is formed by a respective geometry of the die and the stamp. A material flow, i.e., a relative movement between the workpiece and a surface of the deep drawing tool, and a plastic deformation of the workpiece can take place. During the forming, the material flow in a contact zone between the die, the workpiece, and the hold down can have a strong effect on a quality of the formed or resulting component, for example on a geometric accuracy.

One possibility for controlling this material flow and the quality of the component resulting therefrom can be to generate a pressure between the tool and the hold down, for example by way of cushion cylinders of a press acting on the hold down. The cushion cylinders can in particular be designated as damping cylinders. Scattering elasto-plastic and frictional properties of the respective workpieces can influence the material flow. As a result, in particular forces introduced by the cushion cylinders can be adapted to keep the material flow within a range that results in the desired quality of the formed component. The press can have eight cushion cylinders, for example. The force introduced by each individual cushion cylinder can be set individually.

The production of the respective component, in particular a respective sheet-metal part for the body, preferably comprises multiple process steps. The process steps can be carried out in a manufacturing line designed or designated in particular as a press line. This means that the forming device can be arranged in the manufacturing line.

The workpiece or the original blank can be brought into a desired part shape by deep drawing and/or finish forming and/or trimming and/or perforating, i.e., formed into the component. A part-specific tool is preferably used for each of the process steps, which are designated in particular as work steps.

A cutting device is preferably provided, via which the respective workpiece is cut or cut to size, in particular before the forming. This means that the respective workpiece cut or cut to size via the cutting device can be inserted during the respective forming process into the forming device or the forming tool and can subsequently be formed. The cutting device can be designated in particular as a blank trimming system.

The manufacturing line and the cutting device are preferably formed separately from one another. This means that the manufacturing line and the cutting device can be two systems separated from one another in location. For example, the cut blanks can be stored, wherein the stored blanks can subsequently be supplied to the forming device. The stored blanks are stacked, for example, to be able keep a space requirement particularly small. Alternatively, the manufacturing line can comprise the cutting device.

The respective workpiece is preferably cut from a metal strip, which is in particular wound, via the cutting device. This means that the respective workpiece is formed by cutting or cutting to size of the metal strip. The metal strip is preferably formed as a sheet-metal strip. The metal strip can in particular be designated as a coil. This can be understood in particular as a strip steel roll or as a steel wire roll. Alternatively, the metal strip can be formed from aluminum. The cutting device can therefore be designated in particular as a coil system.

In the method, via at least one optical acquisition device, at least one respective item of information characterizing a relative location of the respective workpiece inserted in the forming device or the forming tool in relation to at least one reference point of the forming device or the forming tool is acquired or detected. In other words, the information is acquired via the optical acquisition device which characterizes the relative location of the respective workpiece inserted in the forming device or in the forming tool at the at least one reference point of the forming device. This means that the workpiece is acquired in its inserted state in the forming device or the forming tool via the optical acquisition device.

The respective information can be understood in particular as a respective dimension characterizing the relative location of the respective workpiece inserted in the forming device or the forming tool in relation to the reference point of the forming device. The information is preferably dependent on the relative location of the respective workpiece.

For example, a first value of the information is acquired via the optical acquisition device when the respective workpiece is located in a first relative location relative to the reference point in the forming device. For example, a second value of the information, different from the first value, is acquired via the optical acquisition device when the respective workpiece is located in a second relative location, different from the first location, relative to the reference point in the forming device.

In order to increase a respective quality of the respective formed workpiece in particular, it is provided according to the disclosure that in a respective one of the forming processes, depending on the information acquired in the respective forming process and depending on the items of information acquired in preceding ones of the forming processes carried out before the respective forming process and stored in an electronic computing device, at least one parameter for adapting the respective forming process for forming the respective workpiece is determined or calculated. In other words, in the respective forming process, the information acquired in the respective forming process and the items of information acquired in the preceding forming processes are used as input variables, wherein the parameter is determined or calculated as an output variable depending on the input variables.

This can be understood in particular to mean the following: The respective forming process is carried out multiple times. The respective workpiece is formed in each of the respective forming processes. In each of the respective forming processes, the respective information is acquired and in particular stored in the electronic computing device. Therefore, while the respective forming process is carried out, the items of information acquired during the preceding ones of the forming processes are already present, which are stored in the electronic computing device.

For example, in a first of the forming processes, a first of the workpieces is formed. For example, in a second of the forming processes carried out after the first forming process, a second workpiece formed separately from the first workpiece is formed. For example, in a third of the forming processes carried out after the second forming process, a third workpiece formed separately from the second workpiece is formed. For example, in a fourth of the forming processes carried out after the third forming process, a fourth workpiece formed separately from the respective workpieces is formed.

In the first forming process, a first value of the information is acquired. In the second forming process, a second value of the information is acquired. In the third forming process, a third value of the information is acquired. In the third forming process, depending on the information acquired in the third forming process, in particular the third value, and depending on the items of information acquired in the first and the second forming process and stored in the electronic computing device, in particular depending on the first and the second value, the parameter for adapting the third forming process for forming the third workpiece is determined.

For example, in the fourth forming process, depending on the information acquired in the fourth forming process, in particular the fourth value, and depending on the information acquired in the first, second, and third of the forming processes and stored in the electronic computing device, in particular depending on the first, the second, and the third value, the parameter for adapting the fourth forming process for forming the fourth workpiece is determined.

The electronic computing device is designed, for example, as a database. The determination of the respective parameter can be carried out via the electronic computing device or via a further electronic computing device formed separately from the electronic computing device.

The respective forming process can be adapted or adjusted, in particular optimized, via the parameter. This means that the respective forming process can depend on the respective parameter. The parameter can therefore be understood in particular as a process parameter of the forming process, in particular for setting the forming process.

The forming process can be carried out depending on the determined parameter. The respective forming process can be manually or automatically adapted or adjusted depending on the parameter. The manual adaptation can be understood in particular to mean that a handling instruction for system personnel is determined or generated as the parameter, wherein the system personnel carry out or adapt the respective forming process depending on the handling instruction.

The disclosure is based in particular on the following findings and considerations. It can be provided that handling recommendations for maintaining robust production processes and thus for ensuring a particularly high vehicle quality are provided to the system personnel of the manufacturing line via data, which can be obtained or determined during a production of the respective workpiece and/or the respective component. In this case, for example, a quality of the respective semifinished product, in particular a sheet-metal thickness and/or a surface roughness and/or a lubricant quantity and/or strength characteristic values of the respective semifinished product can be acquired via at least one respective sensor and stored in an electronic computing device, which is central in particular, in particular a database. Production parameters or items of information of the cutting device, in particular the blank trimming system, or the manufacturing line can be stored for this purpose, wherein the acquired items of information or data can be uniquely assigned to individual workpieces. For example, a quality feature, which is selected in particular, in particular cracking, of each individual one of the produced components can be acquired. Numerous essential relationships can thus be determined between properties of the raw material, process parameters, and a quality of the produced components resulting therefrom.

The respective relative location of the respective workpiece during or after the insertion in the forming device or the forming tool and/or a dimension of the respective workpiece can especially influence the quality of the respective component produced by the forming. In particular if an edge contour of the workpiece is completely cut via a cutting tool, which can be operated in the coil system, the cut edge contour of the respective workpiece can have a very slight geometric variation of a geometry of the workpiece. This means that the respective edge contour can be cut particularly precisely. In particular if the edge contour of the respective workpiece at least partially comprises an original edge of the metal strip, particularly large variations of the dimension of the respective cut workpiece can thus result. This means that the respective edge contour of the respective cut workpiece can be particularly imprecise. This can be the case in particular in that a tolerance, which is permissible according to DIN in particular, of a strip width of the metal strip, in particular depending on the width of the metal strip, can be greater than a permissible tolerance of the cut of the respective workpiece via the cutting tool. The workpieces processed in the manufacturing line, in particular formed via the forming device, can therefore be subject to variations with respect to their respective dimensions. This means that the respective workpiece can have tolerance-related deviations from the target geometry of the respective workpiece.

The respective dimension of the respective workpiece can typically influence the respective relative location of the respective workpiece in the forming device. If the respective relative location is not ideal, the quality of the respective formed workpiece or component can be particularly low or nonoptimal. Therefore, in particular if a scattering width with respect to the relative location increases especially, corresponding problems can occur with regard to the quality of the formed components.

In the method according to the disclosure, for example, the variation of the dimensions of the workpieces can be detected by the acquisition of the respective information. In particular the respective parameter via which the respective forming process can be adapted such that the respective quality of the respective formed component can especially be increased can thus be determined in particular in the varying dimensions of the workpieces. In the method according to the disclosure, in particular problems of the respective forming process induced by the variations of the dimensions of the workpieces can be acquired or recognized. This can in particular be carried out via the items of information stored in the electronic computing device. Moreover, via the method according to the disclosure, an inadvertent adjustment of the relative location of the respective workpiece in the forming device or the forming tool can be recognized. A particularly high quality of the respective formed workpieces and thus the respective component can thus be ensured. Furthermore, in the method according to the disclosure, a process control of the respective forming process can especially be improved via data enrichment. This can be achieved in particular via the items of information stored in the electronic computing device.

In principle, it would be conceivable to determine the dimension of the respective workpiece, in particular in a planar state, before the respective workpiece is fed into the forming device or the forming tool. However, the holding element or the plate holder can have a curvature, due to which the respective workpiece inserted in the forming device or the forming tool can be curved. This means that it can be advantageous, in particular with respect to precision, to take into consideration a local inclination of the holding element or the plate holder, in particular in the area of a positioning element designated as a guide, in the determination of the parameter, in particular in the determination of a correction of the respective relative location of the respective workpiece. In the method according to the disclosure, the respective information is acquired via the optical acquisition device while the respective tool is inserted in the forming device or the forming tool. The curvature or the local inclination of the holding element or the plate holder is therefore taken into consideration, in particular implicitly, in the method according to the disclosure. The quality of the respective formed workpiece can thus be increased in particular.

Preferably, the respective information is automatically acquired and/or the respective parameter is automatically determined. It is thus possible to perform checking or optimizing continuously in contrast to a conventional method, in which the information or the relative location of the respective workpiece can only be checked in a spot check and in particular upon the occurrence of problems.

It is preferably provided that in the respective forming process, the respective information acquired via the optical acquisition device is stored in the electronic computing device.

It is preferably provided that the respective information is acquired before the workpiece is formed via the forming tool, in particular via the stamp, of the forming device. In other words, the respective workpiece inserted in the forming device or the forming tool has a non-deformed state before the forming, wherein the workpiece has a deformed or formed state, which is caused by the forming and different from the non-deformed state, after the forming, wherein the workpiece is acquired in the nondeformed state via the optical acquisition device. The respective information characterizing the relative location of the respective nondeformed workpiece inserted in the forming device or the forming tool is thus acquired via the optical acquisition device. The respective workpiece is therefore acquired via the optical acquisition device in the inserted state before the forming. The respective parameter can thus be determined particularly precisely.

It is preferably provided that to acquire the respective information, the edge contour of the respective workpiece inserted in the forming device or in the forming tool is acquired via the optical acquisition device. In other words, the edge contour of the respective workpiece inserted in the forming device or the forming tool is acquired via the optical acquisition device, wherein the information is determined or acquired depending on the acquired edge contour. The information or the respective relative location can thus be acquired or determined particularly precisely.

In a further embodiment, it is provided that the respective parameter is determined depending on the items of information stored in the electronic computing device via at least one statistical method. In other words, the parameter is determined via an algorithm, which is based on at least one statistical method or comprises the at least one statistical method, depending on the respective items of information. A scattering of the respective variables stored in the electronic computing device can therefore be taken into consideration via the statistical method. The respective parameter can thus be determined particularly precisely.

Alternatively or additionally, it can be provided that the respective parameter is determined depending on the items of information stored in the electronic computing device via machine learning. This means that the respective parameter is determined depending on items of information stored in the electronic computing device via a method based on artificial intelligence.

The statistical method can be understood in particular as a statistical procedure. For example, the statistical method can comprise or take into consideration at least one location parameter and/or at least one scattering parameter. For example, the location parameter is a mean value, a median, or a mode of the respective information stored in the electronic computing device. The scattering parameter is, for example, a variance or a standard deviation of the items of information stored in the electronic computing device.

In a further embodiment, it is provided that the parameter is determined depending on a deviation of the information acquired in the respective forming process from a target value determined depending on the items of information acquired, in particular stored, in the preceding forming processes. This means that the target value depends on the acquired, in particular stored, items of information of the preceding forming processes, wherein in the respective forming process, the deviation of the information acquired in the respective forming process from the target value is determined or calculated. In the respective forming process, the parameter is determined or calculated depending on the deviation. In other words, depending on the items of information determined in the preceding forming processes or stored in the electronic computing device, the at least one target value is determined, wherein the parameter is determined in the respective forming process depending on a deviation of the information acquired in the respective forming process from the target value. This means that in the respective forming process, the deviation of the information acquired in the respective forming process from the target value is determined, wherein the parameter is determined via the deviation. The parameter can thus be determined particularly advantageously, in particular particularly precisely.

For example, in the third forming process, the target value is determined depending on the items of information acquired or stored in the first and second forming process, in particular depending on the first and the second value, wherein in the third forming process, the parameter is determined depending on a deviation of the information acquired in the third forming process, in particular of the third value, from the target value.

For example, the target value is determined in the fourth forming process depending on the items of information acquired or stored in the first, the second, and the third forming process, in particular depending on the first, the second, and the third value, wherein in the fourth forming process, the parameter is determined depending on the deviation of the information acquired in the fourth forming process, in particular of the fourth value, from the target value.

It is preferably provided that via the optical acquisition device, in particular as the respective information, in the respective forming process the relative location is acquired of the respective workpiece inserted in the forming device or in the forming tool relative to a contour of the forming device, in particular the forming tool, which is in particular fixed in relation to the forming device or the forming tool, and/or the relative location of the respective workpiece inserted in the forming device or in the forming tool relative to at least one positioning element of the forming device and/or at least one length dimension, in particular the dimension, of at least a section of the workpiece inserted in the forming device or the forming tool.

This can be understood in particular to mean the following: The respective information can be the relative location of the workpiece inserted in the forming device or the forming tool relative to the contour, which is in particular fixed in relation to the forming device, of the forming device. The contour, which is in particular fixed, can thus be used as the reference point or can be the reference point. Alternatively or additionally, the respective information is the relative location of the respective workpiece inserted in the forming device or the forming tool relative to the at least one positioning element of the forming device. The respective positioning element can thus be used as the reference point or the respective reference point can be arranged on the respective positioning element. Alternatively or additionally, the respective information is the length dimension, in particular the dimension, of at least the section of the respective workpiece. The relative location or the information can thus be acquired or determined particularly precisely. The parameter can thus be determined particularly precisely.

In the algorithm, a scattering of the relative location and/or a scattering of the relative distance to the at least one positioning element and/or a relative scattering of the respective length dimension or the respective dimension can thus be judged or taken into consideration.

For example, the dimension or the change of the dimension of the respective workpiece can be recognized visually due to a changed contact area, induced by clamping, between the respective workpiece and the respective positioning element.

The contour can be a noticeable area of a part of the forming device, in particular the forming tool. For example, the contour is an edge. The contour can be fixed or non-fixed.

The non-fixed contour can be understood, for example, to mean that the contour or the part of the forming device comprising the contour, in particular the forming tool, is moved during the forming, in particular relative to the workpiece, i.e., is not stationary in space. For example, the holding element can comprise the contour.

The fixed contour of the forming device can be understood in particular as a stationary area of the forming device, wherein the stationary area is not moved in space in the respective forming process, in particular in the forming. This means that there is no movement of the fixed contour in the respective forming process, in particular in the forming. The location of the respective workpiece relative to at least one tool edge which does not change its location can therefore be acquired.

Alternatively or additionally, the fixed contour can be understood in particular to mean that a relative position of the fixed contour in the forming device is constant or identical in the forming processes before beginning the forming. This means that the position of the fixed contour is the same or identical in all forming processes. The fixed contour is preferably formed as an edge. Via the fixed contour, the relative location of the workpiece inserted in the forming device can be acquired or determined particularly precisely.

The respective positioning element is preferably provided for setting the relative location of the respective workpiece inserted in the forming device or for securing the location, in particular in the transverse and/or longitudinal direction. Preferably, several of the positioning elements are provided. For example, the respective positioning element is formed as a pin. The respective positioning element can be designated in particular as a guide. The location of the respective workpiece can thus be acquired relative to the guide or the guides.

The length dimension or the dimension can be understood, for example, as a length or a geometry of the edge contour of the respective workpiece. Alternatively or additionally, the length dimension or the dimension can be understood as a length of at least one side of the respective workpiece.

The respective positioning element is preferably movable or, in particular between at least two positions, adjustable relative to the forming tool or relative to the workpiece inserted in the forming device. The location of the respective workpiece in the forming device can thus be set or defined.

It is preferably provided that to adapt the respective forming process, an adjustment position of the adjustment or movement of the at least one positioning element of the forming device relative to the forming tool or the respective workpiece inserted in the forming device is determined. In other words, the adjustment or movement of the positioning element relative to the forming tool or the workpiece is determined as the parameter. For example, if the positioning element is located in a first of the positions, the second of the positions can be determined as the adjustment position. For example, if the positioning element is located in the second position, the first position can be determined as the adjustment position.

This means that when a change of the geometry of the respective workpiece occurs or is acquired in the respective forming process, a location of the respective positioning element in the forming device can be adopted by the adjustment or movement of the respective positioning element. For example, if a width of the respective workpiece particularly increases or is particularly large, a distance between two of the positioning elements is particularly enlarged. For example, the location of the positioning elements is changed, in particular the respective distance is reduced, if the dimension or the width of the respective workpiece decreases or is particularly small. The respective positioning element, in particular with varying dimension of the respective workpiece, can thus be readjusted or corrected in a timely manner. The quality of the formed workpiece or the produced component can be influenced or particularly increased by the movement or adjustment of the respective positioning element.

The handling instruction for the system personnel can thus comprise changing or moving the respective positioning element.

The adjustment of the positioning element can result in problems or quality losses in subsequent manufacturing tasks, for example, in the event of absent or flawed documentation. The determined parameter, in particular the movement or adjustment of the at least one positioning element, can therefore be stored in the electronic computing device.

It is preferably provided that the optical acquisition device, via which the respective information is acquired, is spaced apart from the forming tool. In other words, the optical acquisition device is arranged outside the forming tool. The forming tool can thus be exchanged or replaced, for example, independently of the optical acquisition device. The optical acquisition device is preferably mounted or arranged within the manufacturing line at a suitable point, so that the optical acquisition device can be used for the produced components, in particular for all produced components.

Alternatively, the optical acquisition device can be arranged, in particular fixed, on the forming tool. This means that the optical acquisition device can alternatively not be spaced apart from the forming tool.

The optical acquisition device is preferably formed separately from the forming tool. For example, the optical acquisition device is arranged on a housing element or a stand of the forming device.

It is preferably provided that the parameter is determined depending on a correlation, which is in particular stored in the electronic computing device, between the respective items of information acquired, in particular stored, in the preceding forming processes and a respective quality variable, which is acquired in the preceding forming processes, is in particular stored in the electronic computing device, and characterizes a quality of the respective formed workpiece. In other words, in the respective forming process, the parameter is determined depending on the acquired, in particular stored, items of information and depending on the acquired, in particular stored, quality variables. This means that in a further algorithm, which is in particular carried out separately from the algorithm, a relationship can be determined or calculated between the scattering of the dimension of the respective workpiece and the quality resulting therefrom of the respective component produced.

The correlation can be understood in particular as a relationship between the respective acquired information and the respective acquired quality variable or the quality of the respective workpiece. For example, the quality variable is a strength or rigidity characteristic value of the respective formed workpiece or the produced component. Alternatively, the quality variable can be a dimension characterizing a dimensional accuracy and/or a cracking and/or a corrugation of the formed workpiece or the produced component.

For example, a first quality value of the quality variable is acquired in the first forming process. For example, a second quality value of the quality variable is acquired in the second forming process. For example, a third quality value of the quality variable is acquired in the third forming process. For example, a fourth quality value of the quality variable is acquired in the fourth forming process.

For example, in the third forming process, the parameter is determined depending on the correlation, which is in particular stored in the electronic computing device, between the items of information acquired, in particular stored, in the first and the second forming process, in particular the first and the second value, and the quality variables acquired, in particular stored, in the first and second forming process, in particular the first and the second quality value.

For example, in the fourth forming process, the parameter is determined depending on the correlation, which is in particular stored in the electronic computing device, between the items of information acquired, in particular stored, in the first, the second, and the third forming process, in particular the first, the second, and the third value, and the quality variables acquired, in particular stored, in the first, the second, and the third forming process, in particular the first, the second, and the third quality value.

The relationship between the respective acquired information and the quality of the respective workpiece is therefore taken into consideration in the respective forming process. The quality of the formed workpiece can thus be increased in particular.

It can be provided that data generated in the method, in particular the acquired items of information and/or the determined parameters and/or the acquired quality variables, are stored together with the plate thickness and/or the surface roughness and/or the lubricant quantity and/or the strength characteristic value of the respective semifinished product or the respective workpiece in the electronic computing device. Production parameters or items of information of the cutting device, in particular the blank trimming system, or the manufacturing line can be stored in this case, wherein the acquired items of information or data can be uniquely assigned to individual workpieces. Numerous essential relationships between properties of the raw material, process parameters, and a quality resulting therefrom of the produced components can thus be determined. This means that the data generated in the method, in particular the acquired items of information and/or the determined parameters and/or the acquired quality variables, can supplement process parameters for a process control.

A second aspect of the disclosure relates to a forming device for forming workpieces, which is designed to carry out a method according to the first aspect of the disclosure. Advantages and advantageous embodiments of the first aspect of the disclosure are to be viewed as advantages and advantageous embodiments of the second aspect of the disclosure and vice versa.

Further features of the disclosure result from the claims, the figures, and the description of the figures. The features and combinations of features mentioned above in the description and the features and combinations of features mentioned hereinafter in the description of the figures and/or solely shown in the figures are usable not only in the respective specified combination but also in other combinations or alone.

BRIEF DESCRIPTION OF THE DRAWINGS

The disclosure will now be explained in more detail on the basis of a preferred exemplary embodiment and with reference to the drawings.

In the figures, identical or functionally identical elements are provided with identical reference signs.

DETAILED DESCRIPTION OF THE DRAWINGS

Figure 1:
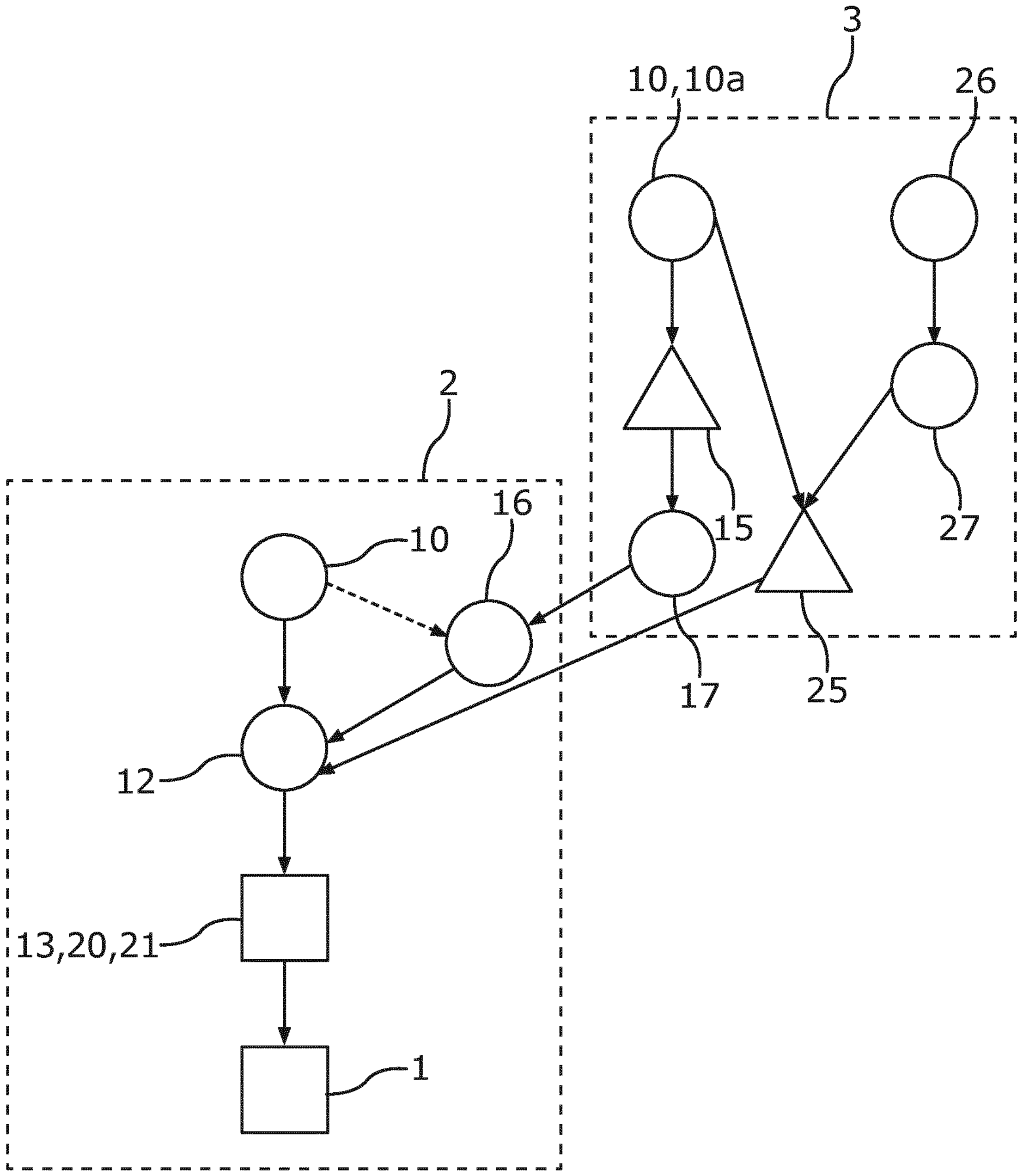
FIG. 1 shows a schematic method diagram of a method according to the disclosure.
Figure 2:
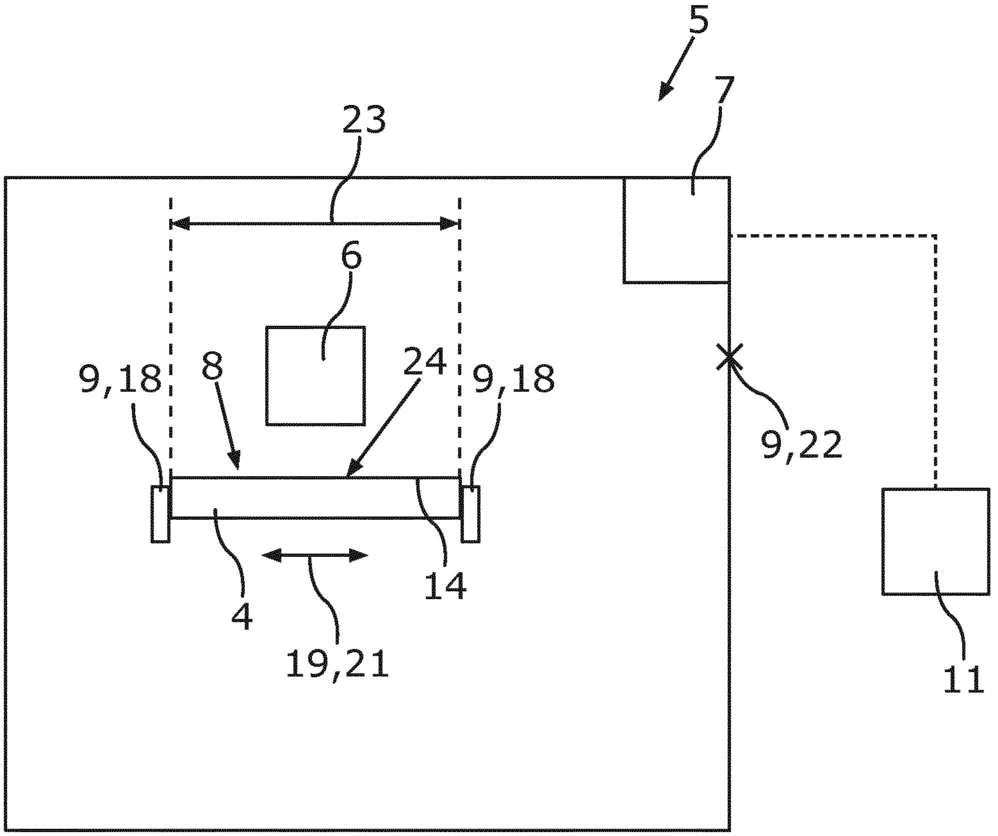
FIG. 2 shows a schematic view in partial section of a forming device according to the disclosure, via which a method according to the disclosure can be carried out.

FIG. 1 shows a schematic method diagram of a method for optimizing 1 forming processes 2, 3 for forming workpieces 4, which are metallic in particular. FIG. 2 shows a schematic view in partial section of a forming device 5, which is designed to carry out the method. The forming device 5 is designed or provided for forming the workpieces 4.

In the respective forming process 2, 3, the respective workpiece 4 is formed via a forming tool 6 of the forming device 5. This means that multiple forming processes 2, 3 are carried out, wherein a respective one of the workpieces 4 is formed during each of the forming processes 2, 3. As illustrated in FIG. 2, the respective workpiece 4 is inserted here in the forming device 5 or in the forming tool 6. The forming tool 6 is outlined particularly schematically in FIG. 2.

The forming is preferably deep drawing. This means that the forming tool 6 can be designed as a deep drawing tool. The deep drawing tool preferably comprises a stamp. The deep drawing tool can comprise a holding element designed in particular as a hold down. The deep drawing tool can have a die. The stamp preferably does not move during the deep drawing. This means that the stamp is stationary during a deep drawing process, in which the respective workpiece is formed via the deep drawing tool.

In a first step of the deep drawing process, the die preferably moves relative to the workpiece 4, in particular downward. As soon as the die, the workpiece, and the hold down are in contact, i.e., they touch one another, the hold down preferably follows the movement of the die until the deep drawing tool is closed. The workpiece 4 is formed by a respective geometry of the die and the stamp. A material flow, i.e., a relative movement between the workpiece and a surface of the deep drawing tool, and a plastic deformation of the workpiece can occur in this case.

The respective workpiece 4 is preferably formed as a semifinished product. This means that in the respective forming process 2, 3, the respective workpiece 4 is formed into a component. The forming is thus provided for producing the component. The component is preferably a body part of a body of a motor vehicle, in particular an automobile.

In the method, via an optical acquisition device 7 (e.g., a camera or an optical sensor), at least one respective item of information 10 characterizing a relative location 8 of the respective workpiece 4 inserted in the forming device 5 or in the forming tool 6 in relation to at least one reference point 9 of the forming device 5 is acquired. This means that in the respective forming process 2, 3, the respective information 10 is acquired, which characterizes the relative location 8 of the respective workpiece 4 inserted in the forming device 5 in relation to the at least one reference point 9.

In order to be able to increase a quality of the respective workpiece 4 formed via the forming device 5 in particular, as illustrated in FIG. 1, it is provided that in a respective one of the forming processes 2, depending on the information 10 acquired in the respective forming process 2 and depending on items of information 10, 10*a* acquired in preceding ones of the forming processes 3 carried out before the respective forming process 2 and stored in an electronic computing device 11, at least one parameter 12 for adapting 13 the respective forming process 2 for forming the respective workpiece 4 is determined. This means that in each of the forming processes 2, 3 the information 10 is acquired via the optical acquisition device 7 and stored in the electronic computing device 11. The stored items of information 10*a* of the preceding forming processes 3 are thus present in the electronic computing device 11 when the respective forming process 2 is carried out. In the respective forming process 2, the parameter 12 can thus be determined via the information 10 acquired in the respective forming process 2 and via the items of information 10*a* stored in the electronic computing device 11. The electronic computing device 11 is schematically shown in FIG. 2. The electronic computing device 11 may comprise a processing unit (e.g., a processor, microprocessor, CPU, etc.) and a storage unit (e.g., memory, RAM, hard disk, etc.).

The parameter 12 is provided for adapting the respective forming process 2. The respective forming process 2 can thus be optimized by the adaptation 13. The items of information 10*a* stored in the electronic computing device 11 can thus be used in or for the optimization 1. This means that the optimization 1 is based on findings determined or obtained in the preceding forming processes 3. Differences from the preceding forming processes 3 can therefore be determined or established, for example, in the respective forming process 2. This can be taken into consideration in the determination of the parameter 12. The quality of the formed respective workpiece 4 can thus be increased in particular. This can be achieved, for example, by a particularly improved process control of the respective forming process 2 depending on the parameter 12, in particular by data enrichment.

The electronic computing device 11 is preferably connected in a data-transmitting manner to the optical acquisition device 7.

It is preferably provided that, in particular in the respective forming process 2 and the preceding forming processes 3, the respective information 10 is acquired before the respective workpiece 4 is formed via the forming tool 6 of the forming device 5. The respective information 10 can thus be acquired particularly precisely. This can be the case, for example, in that the respective information 10 thus cannot be corrupted or changed by the forming of the workpiece 4.

It is preferably provided that, in particular in the forming processes 2, 3, an edge contour 14 of the respective workpiece 4 inserted in the forming device 5 or the forming tool 6 is acquired via the optical acquisition device 7 to acquire the respective information 10. The quality of the respective formed workpiece 4 can thus be increased in particular. This can be achieved, for example, in that the respective edge contour 14 can have a particularly high influence on the quality of the formed workpiece 4.

For example, the edge contour 14 can deviate, in particular because of tolerances, from a predefined or desired target geometry due to cutting to size of the respective workpiece 4. This deviation can influence the relative location 8 of the respective workpiece 4 in the forming device 5. This means that the relative location 8 of the respective workpiece 4 inserted in the forming device 5 can deviate as a result of the deviation, which is in particular tolerance-related, of the edge contour 14 from a desired or predefined relative location of the respective workpiece 4 in the forming device 5. This can negatively influence the forming of the respective workpiece via the forming tool 6. A quality of the formed workpiece 4 can thus be particularly low or inadequate. Due to the acquisition of the edge contour 14, the deviation of the edge contour 14 can thus be taken into consideration in the determination of the parameter 12 by way of the relative location 8. The relative location 8 can thus be corrected, for example, by which the respective forming process 2 can be optimized particularly advantageously. The quality of the respective formed workpiece 4 can thus be increased in particular.

In a further embodiment, it is provided that the parameter 12 in the respective forming process 2 is determined depending on the items of information 10*a* stored in the electronic computing device 11 via at least one statistical method 15. This means that the statistical method 15 is used to determine or calculate the parameter 12 via the items of information 10*a* stored in the electronic computing device 11. The parameter 12 can thus be determined particularly precisely. The quality of the formed respective workpiece can thus be increased in particular. The statistical method 15 can be carried out or used during the respective forming process 2 and/or during the preceding forming processes 3.

In a further embodiment, it is provided that in the respective forming process 2, the parameter 12 is determined depending on a deviation 16 from the information 10 acquired in the respective forming process from a target value 17 determined depending on the items of information 10, 10*a* acquired or stored in the preceding forming processes 3. This means that the target value 17 depends on the acquired or stored items of information 10, 10*a* of the preceding forming processes 3, wherein the deviation of the information acquired in the respective forming process 2 from the target value 17 is determined or calculated in the respective forming process 2. In the respective forming process 2, the parameter 12 is determined or calculated depending on the deviation 16. The parameter 12 can thus be determined particularly advantageously, in particular particularly precisely. The quality of the formed workpiece 4 can thus be increased in particular.

The target value 17, in particular in the respective forming process 2 and/or in the preceding forming processes 3, can be determined depending on the items of information 10, 10*a* determined or stored in the preceding forming processes 3, in particular via the statistical method 15.

In the exemplary embodiment shown in FIG. 2, the forming device 5 comprises at least one positioning element 18 designated as a guide. Two of the positioning elements 18 are shown here in FIG. 2. The respective positioning element 18 is provided for holding or fixing the respective workpiece 4 inserted in the forming device 5 or in the forming tool 6. This means that the respective positioning element 18 can be provided for securing the location of the respective workpiece 4 in the forming device 5. This means that the relative location 8 can be set or defined via the respective positioning element 18. The respective positioning element 18 is preferably adjustable or movable, in particular along at least one movement direction 19, relative to the forming tool 6, in particular the stamp and/or the die, or the respective workpiece 4. The respective positioning element 18 can therefore be adjusted or moved, in particular along the movement direction 19, between at least two adjustment positions 20. The relative location 8 of the respective workpiece 4 can thus be set or specified via the respective positioning element 18.

It is preferably provided that for adapting 13 the respective forming process 2, one of the adjustment positions 20 of the adjustment 21 or movement of the respective positioning element 18 relative to the forming tool 6 or the respective workpiece 4 inserted in the forming device 5 is determined. This means that the adjustment position 20 is determined as the parameter 12 in the respective forming process 2. In the respective forming process 2, the respective positioning element 18 can thus be adjusted into the respective adjustment position 20, wherein the respective workpiece 4 is formed via the forming tool 6 while the respective positioning element 18 is located in the respective determined adjustment position 20. The respective forming process 2 can thus be optimized particularly advantageously. The quality of the formed workpiece 4 can thus be increased in particular.

It is preferably provided that via the optical acquisition device, in particular in the respective forming process 2 and/or in the preceding forming processes 3, preferably as the respective information 10, the relative location 8 of the respective workpiece 4 inserted in the forming device 5 or in the forming tool 6 relative to a contour 22 of the forming device 5, which is in particular fixed with respect to the forming device 5, is acquired. The contour 22 is preferably formed as an edge. For example, the contour 22, which is in particular fixed, or the edge is arranged on a housing element, in particular a stand, of the forming device 5. Alternatively, the forming tool 6 can comprise the contour 22. The contour 22 can therefore be used as the reference point 9. The relative location 8 can thus be determined particularly precisely.

Alternatively or additionally, via the optical acquisition device 7, in particular as the respective information 10, the relative location 8 of the respective workpiece 4 inserted in the forming device 5 or in the forming tool 6 relative to at least one of the positioning elements 18 of the forming device 5 can be acquired in the respective forming process 2 or in the preceding forming processes 3. The respective positioning element 18 can thus be used as the reference point 9 or the respective reference point 9 can be arranged on the respective positioning element 18. The relative location 8 can thus be determined particularly precisely.

Alternatively or additionally, via the optical acquisition device 7, in particular as the respective information 10, a length dimension 23 of at least a section 24 of the respective workpiece 4 inserted in the forming device 5 or in the forming tool 6 can be acquired in the respective forming process 2 or in the preceding forming processes 3. The relative location 8 can typically depend, in particular particularly strongly, on the length dimension 23. The parameter 12 can thus be determined particularly advantageously, in particular particularly precisely. The length dimension 23 can be understood in particular as a dimension of the respective section 24. The respective section 24 is preferably the edge contour 14 of the respective workpiece 4 or a part of the edge contour 14.

In a further embodiment, it is provided that the optical acquisition device 7, via which the respective information 10 is acquired, is spaced apart from the forming tool 6. The optical acquisition device 7 is therefore preferably arranged outside the forming tool 6. The forming tool 6 can thus be replaced or rebuilt independently of the optical acquisition device 7.

As illustrated in FIG. 1, it is provided in a further embodiment that, in particular in the respective forming process 2, the parameter 12 is determined depending on a correlation 25, which is in particular stored in the electronic computing device 11, between the respective items of information 10, 10*a* acquired or stored in the preceding forming processes 3 and a respective quality variable 27, which is acquired or stored in the preceding forming processes 3 and characterizes a quality 26 of the respective formed workpiece 4. This means that in the respective forming process 2 and/or in the preceding forming processes 3, the respective quality variable 27 is acquired, wherein the correlation 25 is a relationship or a function of the items of information 10, 10*a* acquired or stored in the preceding forming processes 3 and the quality variables 27. The parameter 12 can thus be a function of the correlation 25 stored in the electronic computing device 11. That is to say, the parameter 12 is determined via the correlation 25. An influence of the information 10 acquired in the respective forming process 2 on the quality 26 of the formed respective workpiece 4 can therefore be taken into consideration by the quality variable 27 in the determination of the parameter 12. The respective forming process 2 can thus be optimized particularly advantageously. The quality of the formed workpiece 4 can thus be increased in particular.

LIST OF REFERENCE SIGNS

1 optimization
2 forming process
3 preceding forming processes
4 workpiece
5 forming device
6 forming tool
7 acquisition device
8 location
9 reference point
10 information
10*a* stored information
11 electronic computing device
12 parameter
13 adaptation
14 edge contour
15 statistical method
16 deviation
17 target value
18 positioning element
19 movement direction
20 adjustment position
21 adjustment
22 contour
23 length dimension
24 section
25 correlation
26 quality
27 quality variable

What is claimed is:

1. A method for optimizing forming processes for forming workpieces, the method comprising:

acquiring, by means of an optical acquisition device, a respective item of information characterizing a relative location of a respective workpiece inserted in a forming device in relation to at least one reference point of the forming device, determining, in a respective forming process, at least one parameter for adapting the respective forming process for forming the respective workpiece, depending on the information acquired in the respective forming process and on the items of information acquired during preceding ones of the forming processes carried out before the respective forming process and stored in an electronic computing device, wherein, to adapt the respective forming process, an adjustment position of an adjustment of at least one positioning element of the forming device relative to a forming tool is determined, and wherein the respective workpiece is formed by the forming tool while the positioning element is located in the determined adjustment position.

2. The method according to claim 1, wherein the respective information is acquired before the workpiece is formed by means of the forming tool of the forming device.

3. The method according to claim 1, wherein, to acquire the respective information, an edge contour of the workpiece inserted in the forming device is acquired by the optical acquisition device.

4. The method according to claim 1, wherein the parameter is determined depending on the items of information stored in the electronic computing device by at least one statistical method.

5. The method according to claim 4, wherein the statistical method comprises at least one of a location parameter or a scattering parameter, wherein the location parameter is a mean value, a median, or a mode of the items of information stored in the electronic computing device, and the scattering parameter is a variance or a standard deviation of the items of information stored in the electronic computing device.

6. The method according to claim 1, wherein the parameter is determined depending on a deviation of the information acquired in the respective forming process from a target value determined depending on the items of information acquired in the preceding forming processes.

7. The method according to claim 6, wherein the target value is determined depending on the items of information acquired in the preceding forming processes by a statistical method.

8. The method according to claim 1, further comprising acquiring, by the optical acquisition device:

the relative location of the workpiece inserted in the forming device relative to a contour of the forming device, and/or the relative location of the workpiece inserted in the forming device relative to at least one positioning element of the forming device, and/or a length dimension of at least a section of the workpiece inserted in the forming device.

9. The method according to claim 1, wherein the optical acquisition device, by which the respective information is acquired, is spaced apart from the forming tool.

10. The method according to claim 1, wherein the parameter is determined depending on a correlation between the respective items of information acquired in the preceding forming processes and a respective quality variable, which is acquired in the preceding forming processes and characterizes a quality of the respective formed workpiece.

11. The method according to claim 10, wherein the quality variable is a dimension characterizing a dimensional accuracy and/or a cracking and/or a corrugation of the formed workpiece.

12. A forming device for forming workpieces, which is designed to carry out a method according to claim 1.

13. The method according to claim 1, wherein the forming is deep drawing, and the forming tool is a deep drawing tool comprising a stamp, a holding element, and a die.

14. The method according to claim 1, wherein the respective information acquired by the optical acquisition device is stored in the electronic computing device in the respective forming process.

15. The method according to claim 1, wherein the parameter is determined depending on the items of information stored in the electronic computing device by machine learning.

16. The method according to claim 1, wherein the at least one positioning element is adjustable between at least two adjustment positions relative to the forming tool.

17. The method according to claim 1, wherein the respective forming process is automatically adapted depending on the parameter.

18. The method according to claim 1, wherein the optical acquisition device is arranged on a housing element or a stand of the forming device.

19. The method according to claim 1, wherein the determined parameter is stored in the electronic computing device.

* * * * *